Figure 1:
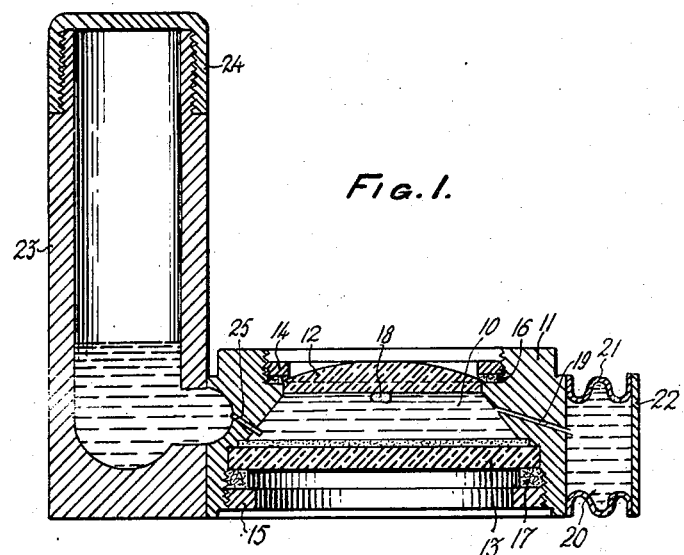

June 6, 1944.   M. R. HOUSEMAN   2,350,612
LIQUID LEVEL
Filed Oct. 29, 1942

INVENTOR.
M. R. HOUSEMAN
BY
ATTORNEY

Patented June 6, 1944

2,350,612

UNITED STATES PATENT OFFICE 2,350,612

LIQUID LEVEL

Melvin R. Houseman, Glen Rock, N. J., assignor to Bendix Aviation Corporation, Bendix, N. J., a corporation of Delaware Application October 29, 1942, Serial No. 463,830

6 Claims. (Cl. 33—212)

The present invention relates to liquid levels adapted for use in sextants, octants, range finders and other instruments wherein it is desired to provide an artificial horizon by means of a bubble, and more particularly to means for forming the bubble.

It is well known to those skilled in the art that in precision instruments of the above type, in which a sealed bubble vessel is used, the size of the bubble varies due to expansion and contraction of the liquid in the vessel due to temperature changes. Heretofore, various expedients have been provided for adjusting the bubble to a desired size but it has been found that known devices do not solve the problem completely especially when used in extremely cold temperatures such as those encountered in the arctic regions. The disadvantage with known devices of this nature resides in that the bubble is formed too rapidly so that its size cannot be controlled accurately enough. By the present invention, novel means are provided whereby the foregoing disadvantage is overcome and the size of the bubble may be readily adjusted at extremely low temperatures.

An object of the present invention, therefore, is to provide a bubble vessel with novel means for rapidly forming a bubble within the vessel.

Another object of the invention is to provide a bubble vessel with novel means adapted to form accurately and rapidly a bubble of a desired size.

A further object of the invention is to provide a novel liquid level device wherein an air bubble may be formed by a simple manual depressing action as distinguished from previously provided adjustable and rotatable knobs.

Another object of the invention is to provide a novel liquid device with a capillary passage providing a more accurate and controllable manner of forming an air bubble within the vessel.

A further object is to provide novel means adapted to act in the nature of a pump for forming an air bubble within a liquid level.

The above and other objects and advantages of the invention will appear more fully hereinafter from a consideration of the detailed description which follows, taken together with the accompanying drawing wherein two embodiments of the invention are illustrated. It is to be expressly understood, however, that the drawing is for the purpose of illustration only and is not to be construed as a definition of the limits of the invention.

Figure 2:
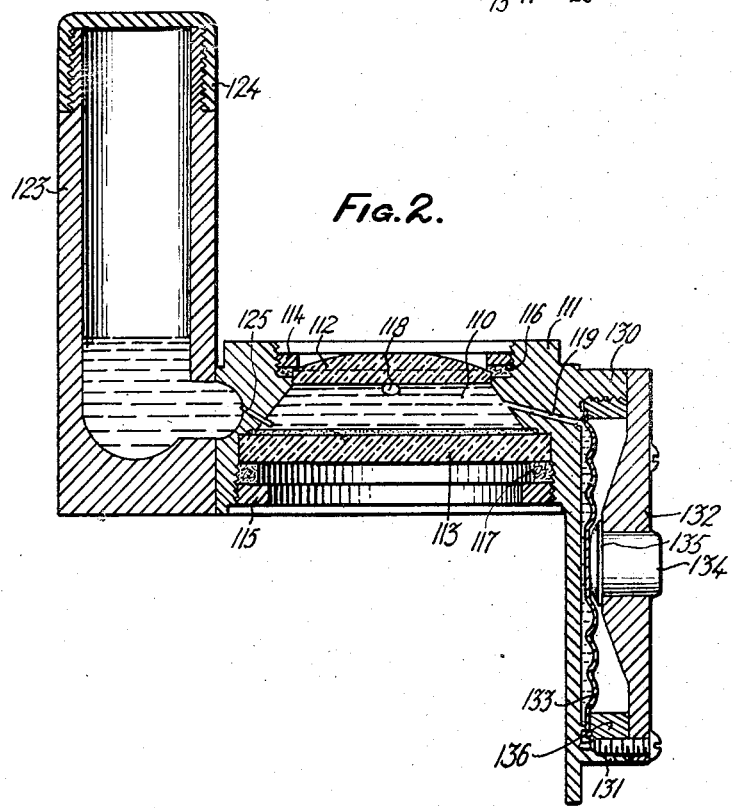

Figure 1 is a vertical longitudinal section taken through one form of liquid level embodying the present invention; and, Figure 2 is a view similar to that of Figure 1, illustrating a second embodiment of the present invention.

Referring now to the drawing, and more particularly to Figure 1 thereof, the liquid level, as shown comprises a bubble chamber 10 formed by a cylindrical vessel 11, a top lens 12 and a bottom lens 13, together with suitable retaining rings 14 and 15 for urging the lenses into contact with suitable abutments formed in the cylindrical vessel. If desired, conventional sealing rings 16 and 17 may be provided between lenses 12 and 13 and the vessel 11 to provide an efficient seal for the liquid level.

The novel means of the invention are now provided for forming and adjusting the size of an air bubble 18 within the bubble chamber and, to this end, bubble chamber 10 is connected by means of a transverse passage 19, formed within a wall of the vessel, with a variable volume chamber 20. The latter chamber is defined by a flexible sleeve 21 formed of metal or other suitable material which is fastened to vessel 11 in any known manner, such as, by soldering, for example, while the opposite end of the sleeve is provided with a rigid disc or button 22. Sleeve 21, preferably, is formed with one convolution so as to admit of freedom of motion along its longitudinal axis but is maintained relatively rigid along its lateral axis. The chamber defined by sleeve 21 is filled with the same liquid as that contained within the bubble chamber by virtue of transverse passage 19.

A fluid reservoir 23 is secured to or formed integrally with vessel 11 and is provided with a cover 24 for the open end thereof which is removable when it is desired to supply additional fluid to the reservoir. A second passage, similar to passage 19, formed within vessel 11, communicates the reservoir with the bubble chamber. A tube 25 is arranged within the second passage to project somewhat into chamber 10 and has formed therein a hairline passage providing a capillary between reservoir 23 and chamber 10. The purpose of the capillary passage will presently appear.

Enough fluid is supplied initially to the device so that chambers 10 and 20 are filled and the liquid level within reservoir 23 exceeds the level of chambers 10 and 20. The remainder of reservoir 23 above the liquid level constitutes an air chamber.

If bubble 18 within chamber 10, due to a temperature change or some other cause, has enlarged too much and it is desired to form a smaller bubble in its stead, the complete device is turned approximately 90° in a clockwise direction until bubble 18 assumes a new position adjacent capillary 25. Button 22 is pressed slightly inwardly so that the air of the bubble is forced through the capillary as well as the liquid within reservoir 23 into the air space within the reservoir. Upon release of the slight depressing force, button 22 returns to its normal position, due to the inherent resiliency of sleeve 21, and draws a slight amount of fluid into the bubble chamber so that chamber 10, as well as chamber 20, becomes completely filled with the liquid. Depending upon the size of the bubble within chamber 10, button 22 may have to be pressed inwardly a second time to completely remove the bubble.

The complete device is now returned to its normal position and subsequently turned approximately 90° in a counterclockwise direction so that the liquid within reservoir 23 will pass to the far side of the reservoir and the air space is brought to communicate with the reservoir end of the capillary tube. Sleeve 21 is again depressed slightly by means of a force applied to button 22 and a small portion of the liquid is forced out of chamber 10 into reservoir 23. Upon release of the depressing force sleeve 21 is returned to its normal position and simultaneously with such return a slight suction is created at the mouth of the capillary passage so that air is introduced into the bubble chamber from the reservoir air space in the form of small bubbles.

By virtue of capillary tube 25 the air will not enter the bubble chamber in a relatively large amount as heretofore but enters slowly in the form of a series of minute bubbles to form a single bubble within the bubble chamber. If the bubble formed with the foregoing operation is still too small, sleeve 21 will again be depressed so that on returning to its normal position more air is introduced into the bubble chamber to increase the bubble in size. The amount of air introduced into the bubble chamber may be determined to some extent by the amount of force exerted upon button 22. The provision of capillary 25 thus results in a more accurate method of forming a bubble of the desired size.

A slightly modified form of the present invention, illustrated in Figure 2, is provided for performing substantially the same purpose and operation as above described. Parts in this figure corresponding to like parts of Figure 1 are designated with the same reference characters plus 100. In place of the flexible sleeve 21 of Figure 1, the outside of vessel 111 is provided with members 130 and 131, secured thereto or formed integrally therewith. A plate or cover 132 is secured to members 130 and 131 so that the outer wall of vessel 111, members 130, 131 and plate 132 define a chamber within which is mounted a resilient diaphragm 133 dividing the former chamber into an air chamber to the right of the diaphragm and a liquid chamber to the left of the diaphragm. A suitable annular ring 136 is provided for clamping the free ends of diaphragm 133 against an annular abutment projecting from the outside wall of vessel 111.

The liquid chamber formed by resilient diaphragm 133 and the outer wall of vessel 111 contains the same liquid as that contained within bubble chamber 110 by virtue of the transverse communicating passage 119 formed in vessel 111.

Plate or cover 132 is provided with a central aperture for mounting therein a slidable actuating button 134 which is adapted to engage diaphragm 133 to force liquid out of chamber 110 into reservoir 123. Button 134 is provided, at its inner end with an annular flange 135 and is so arranged that after a depressing force applied to the button has been released, the button is returned to its normal position by reason of the resiliency of the diaphragm which, in returning to its normal position, forces button 134 outwardly until flange 135 engages plate 132.

In operation, the modification of Figure 2 is similar to the operation of the structure of Figure 1. If bubble 118 within bubble chamber 110 is too large, the complete device is turned clockwise approximately 90° until the bubble rests adjacent capillary passage 125. Button 134 is depressed slightly whereby diaphragm 133 is moved a minor amount to the left to force some fluid from out of the liquid chamber through passage 119 to increase the pressure within the bubble chamber. The air of the existing bubble is thus forced through capillary 125 into the air space of reservoir 123. The susbequent release of the depressing force on button 134 permits diaphragm 133 to spring to its normal position to reduce pressure within the bubble chamber and thus create a suction at the mouth of capillary 125 so that bubble chamber 110 is completely filled with liquid.

The device is returned to a normal position and, as explained above in connection with Figure 1, is turned counterclockwise until the air space of the reservoir communicates with the reservoir end of the capillary passage. Button 134 is depressed to press a minor amount of liquid out of the bubble chamber and a subsequent return of the button by the diaphragm draws air from the air space into the bubble chamber in the form of small bubbles to form a single bubble therein.

Although the depressing force on button 134 or sleeve 21 has been explained above as consisting of a single depressing action, it is to be expressly understood that actually the button or sleeve may be subjected to a series of minute taps whereby a series of minute bubbles flows into the bubble chamber until a single bubble of the desired size is developed.

It will now be apparent to those skilled in the art that a novel and desirable bubble forming means for a liquid level has been provided with the use of which an air bubble of a desired size may be rapidly, accurately and controllably formed.

Although but two embodiments of the present invention have been illustrated and described in detail, it is to be expressly understood that the invention is not limited thereto. Various changes can be made in the design and arrangement of the parts without departing from the spirit and scope of the invention as will now be understood by those skilled in the art. For example, vessels 11 and 111 have been described as of a cylindrical shape, however, the vessels may be constructed to have a rectangular or any other desired shape in conformity to the particular instrument with which the present novel liquid level is to be used. For a definition of the limits of the invention, reference will be had primarily to the appended claims.

I claim:

1. A liquid level comprising a bubble chamber, a reservoir having a liquid therein whose level normally exceeds the level of the liquid in the bubble chamber, a capillary passage communicating said reservoir with said bubble chamber and extending into said chamber, said reservoir having an air space above the liquid level therein, a variable volume liquid chamber for pumping an air bubble from said reservoir into said bubble chamber, and means communicating said variable chamber with said bubble chamber.

2. In combination with a bubble vessel, a liquid reservoir having an air space therein, a capillary passage communicating said reservoir with said vessel and extending into said chamber, a variable volume liquid chamber for pumping an air bubble from said reservoir into said bubble vessel, and means comprising a communicating passage between said variable chamber and said bubble vessel.

3. A liquid level comprising a bubble chamber, a reservoir having a liquid therein whose level normally exceeds the level of the liquid in the bubble chamber, a capillary passage communicating said reservoir with said bubble chamber and extending into said chamber, said reservoir having an air space above the liquid level therein, collapsible and expansible means comprising a variable volume liquid chamber for pumping an air bubble from said reservoir into said bubble chamber, and means providing communication between said variable chamber and said bubble chamber.

4. A liquid level comprising a bubble chamber, a reservoir having a liquid therein whose level normally exceeds the level of the liquid in the bubble chamber, a tube having a capillary passage therein for communicating said reservoir with said bubble chamber and extending into said chamber, said reservoir having an air space above the liquid level therein, collapsible and expansible means comprising a variable volume liquid chamber for pumping an air bubble from said reservoir into said bubble chamber, depressible means for actuating said last-named means, and means comprising a communicating passage between said variable chamber and said bubble chamber.

5. In a liquid level, the combination with a bubble vessel, of a first chamber defining a liquid reservoir having an air space therein, means comprising a member having a capillary passage therein for communicating said reservoir with said vessel, said member extending into said vessel, a second chamber independent of said first chamber defining a variable volume liquid chamber for forcing an air bubble from said reservoir into said vessel, and means comprising a passage providing communication between said variable volume chamber and said vessel.

6. In a liquid level, the combination with a bubble vessel, of a first chamber defining a liquid reservoir having an air space therein, a common wall for said vessel and said chamber and having a passage therethrough, a capillary tube supported within said passage and extending from said wall into said vessel for communicating said reservoir with said vessel, a second chamber defining a variable volume liquid chamber for forcing an air bubble from said reservoir into said vessel, and means comprising a passage providing communication between said variable volume chamber and said vessel.

MELVIN R. HOUSEMAN.